United States Patent
Beard et al.

(10) Patent No.: US 10,991,260 B2
(45) Date of Patent: Apr. 27, 2021

(54) INTELLIGENT NON-DISRUPTIVE AUTOMATIC DEPENDENT SURVEILLANCE-BROADCAST (ADS-B) INTEGRATION FOR UNMANNED AIRCRAFT SYSTEMS (UAS)

(71) Applicant: uAvionix Corporation, Bigfork, MT (US)

(72) Inventors: Paul Beard, Bigfork, MT (US); Christian Ramsey, Purcellville, VA (US)

(73) Assignee: UAVIONIX CORPORATION, Bigfork, MT (US)

( * ) Notice: Subject to any disclaimer, the term of this patent is extended or adjusted under 35 U.S.C. 154(b) by 119 days.

(21) Appl. No.: 16/291,557

(22) Filed: Mar. 4, 2019

(65) Prior Publication Data
US 2019/0197907 A1 Jun. 27, 2019

Related U.S. Application Data

(63) Continuation-in-part of application No. 15/905,340, filed on Feb. 26, 2018, now Pat. No. 10,733,894,
(Continued)

(51) Int. Cl.
*G08G 5/00* (2006.01)
*G01S 19/42* (2010.01)
(Continued)

(52) U.S. Cl.
CPC ......... *G08G 5/0082* (2013.01); *B64C 39/024* (2013.01); *G01S 13/003* (2013.01);
(Continued)

(58) Field of Classification Search
CPC .. G08G 5/0082; G08G 5/0052; G08G 5/0021; G08G 5/006; G08G 5/0008;
(Continued)

(56) References Cited

U.S. PATENT DOCUMENTS 5,475,705 A   12/1995 Dent
6,891,906 B1   5/2005 Sogabe et al.
(Continued)

*Primary Examiner* — Peter D Nolan
*Assistant Examiner* — Ashley L Redhead, Jr.
(74) *Attorney, Agent, or Firm* — Suiter Swantz pc llo

(57) ABSTRACT

A system for intelligent non-disruptive airspace integration of unmanned aircraft systems (UAS) is disclosed. The system includes an onboard positioning system and altimeter that determine a current position and altitude of the UAS. Under normal conditions, the UAS remains in inert mode: a transceiver listens for and decodes transmissions from nearby aircraft and ground-based traffic and control facilities. If certain conditions are met (e.g., proximate aircraft, altitude ceilings, controlled or restricted airspaces) the system may declare an alert mode. When in alert mode, the transceiver broadcasts position and identifier information of the UAS to alert neighboring aircraft to its presence. Intelligent transmission strategies regulate the power level or rate of alert-mode transmissions to reduce spectrum congestion due to high UAS density. Alert-mode transmissions continue until the underlying conditions change and inert mode is resumed.

16 Claims, 3 Drawing Sheets

Related U.S. Application Data which is a continuation-in-part of application No. 15/246,095, filed on Aug. 24, 2016, now abandoned.

(60) Provisional application No. 62/638,654, filed on Mar. 5, 2018, provisional application No. 62/480,031, filed on Mar. 31, 2017, provisional application No. 62/209,221, filed on Aug. 24, 2015.

(51) Int. Cl.
  *G01S 13/00* (2006.01)
  *B64C 39/02* (2006.01)
  *G01S 13/933* (2020.01)
  *G01S 13/88* (2006.01)

(52) U.S. Cl.
  CPC ............ *G01S 13/933* (2020.01); *G01S 19/42* (2013.01); *G08G 5/006* (2013.01); *G08G 5/0008* (2013.01); *G08G 5/0013* (2013.01); *G08G 5/0021* (2013.01); *G08G 5/0026* (2013.01); *G08G 5/0043* (2013.01); *G08G 5/0052* (2013.01); *G08G 5/0069* (2013.01); *G01S 13/882* (2013.01)

(58) Field of Classification Search
  CPC .. G08G 5/0013; G08G 5/0026; G08G 5/0069; G08G 5/0043; G01S 13/933; G01S 13/003; G01S 19/42; G01S 13/882; B64C 39/024; B64C 2201/145
  See application file for complete search history.

(56) References Cited

U.S. PATENT DOCUMENTS

| | | | |
|---|---|---|---|
| 7,391,359 B2 | 6/2008 | Ootomo et al. | |
| 7,471,235 B2 | 12/2008 | Ootomo et al. | |
| 7,570,214 B2 | 8/2009 | Smith et al. | |
| 7,706,979 B1 | 4/2010 | Herwitz | |
| 7,782,256 B2 | 8/2010 | Smith | |
| 7,961,136 B2 | 6/2011 | Stefani et al. | |
| 8,072,382 B2 | 12/2011 | Smith et al. | |
| 8,102,301 B2 | 1/2012 | Mosher | |
| 8,130,135 B2 | 3/2012 | Donovan | |
| 8,358,677 B2 | 1/2013 | Collette et al. | |
| 8,368,584 B2 | 2/2013 | Askelson et al. | |
| 8,373,591 B2 | 2/2013 | Margolin | |
| 8,378,881 B2 | 2/2013 | LeMire et al. | |
| 8,380,367 B2 | 2/2013 | Schultz et al. | |
| 8,386,175 B2 | 2/2013 | Limbaugh et al. | |
| 8,467,431 B2 | 6/2013 | Park et al. | |
| 8,955,110 B1 | 2/2015 | Twitchell, Jr. | |
| 9,129,520 B2 | 9/2015 | Limbaugh et al. | |
| 9,208,687 B2 | 12/2015 | Wang et al. | |
| 9,250,320 B2 | 2/2016 | Watson et al. | |
| 9,274,521 B1 | 3/2016 | Stefani et al. | |
| 9,305,280 B1 | 4/2016 | Berg et al. | |
| 9,325,407 B2 | 4/2016 | Horvitz et al. | |
| 9,405,005 B1* | 8/2016 | Arteaga | G08G 5/0091 |
| 9,741,255 B1 | 8/2017 | Navot et al. | |
| 2005/0271125 A1 | 12/2005 | Chedester et al. | |
| 2006/0030994 A1 | 2/2006 | Lai | |
| 2010/0246492 A1 | 9/2010 | Scarlatti et al. | |
| 2010/0283661 A1 | 11/2010 | Strain et al. | |
| 2010/0292871 A1* | 11/2010 | Schultz | G01S 13/867 701/3 |
| 2011/0162573 A1 | 7/2011 | Race et al. | |
| 2011/0189943 A1 | 8/2011 | Ilarregui et al. | |
| 2012/0001788 A1 | 1/2012 | Carlson et al. | |
| 2012/0038501 A1 | 2/2012 | Schulte et al. | |
| 2013/0009823 A1 | 1/2013 | Wang | |
| 2013/0099941 A1 | 4/2013 | Jana et al. | |
| 2014/0324255 A1 | 10/2014 | Siddiqi et al. | |
| 2015/0097714 A1 | 4/2015 | Margolin | |
| 2015/0236778 A1 | 8/2015 | Jalali | |
| 2015/0237569 A1 | 8/2015 | Jalali | |
| 2015/0260824 A1 | 9/2015 | Malveaux | |
| 2015/0331099 A1 | 11/2015 | Wu et al. | |
| 2016/0323031 A1* | 11/2016 | Cain | H04W 72/0453 |
| 2016/0328983 A1* | 11/2016 | Hutchinson | G01C 21/005 |
| 2017/0069214 A1 | 3/2017 | Dupray et al. | |

\* cited by examiner

INTELLIGENT NON-DISRUPTIVE AUTOMATIC DEPENDENT SURVEILLANCE-BROADCAST (ADS-B) INTEGRATION FOR UNMANNED AIRCRAFT SYSTEMS (UAS)

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

United States patent application entitled DIRECT-BROADCAST REMOTE IDENTIFICATION (RID) DEVICE FOR UNMANNED AIRCRAFT SYSTEMS (UAS), naming Paul Beard and Christian Ramsey as inventors, filed Feb. 26, 2018, application Ser. No. 15/905,340;

United States patent application entitled AUTOMATIC DEPENDENT SURVEILLANCE-BROADCAST (ADS-B) TRANSMISSION WITHIN WHITESPACE, naming Paul Beard as an inventor, filed Aug. 24, 2016, application Ser. No. 15/246,095;

United States Provisional Patent Application entitled INTELLIGENT ADS-B FOR UAS-AIRSPACE INTEGRATION, naming Christian Ramsey and Paul Beard as inventors, filed Mar. 5, 2018, Application Ser. No. 62/638,654;

United States Provisional Patent Application entitled REMOTE IDENTIFICATION, naming Paul Beard as an inventor, filed Mar. 31, 2017, Application Ser. No. 62/480,031; and United States Provisional Patent Application entitled AUTOMATIC DEPENDENT SURVEILLANCE BROADCAST TRANSMISSION WITHIN WHITESPACE, naming Paul Beard as an inventor, filed Aug. 24, 2015, Application Ser. No. 62/209,221.

Said U.S. patent application Ser. Nos. 15/905,340; 15/246,095; 62/638,654; 62/480,031; and 62/209,221 are herein incorporated by reference in their entirety.

BACKGROUND

Automated Dependent Surveillance-Broadcast (ADS-B) has been the subject of much debate in recent years as to whether it provides a suitable cooperative surveillance solution for preventing mid-air collisions between manned aircraft and unmanned aircraft (e.g., unmanned aircraft systems (UAS), unmanned aerial vehicles (UAV)). ADS-B is a satellite-based system using global positioning technology (e.g., GPS) to precisely determine an aircraft's position, airspeed, and other attributes and relay this information (e.g., "ADS-B Out") to ground-based stations (which relay the data to air traffic control (ATC) displays) or directly to other aircraft (e.g., "ADS-B In"). In the latter case, pilots whose aircraft are so equipped may receive direct weather and traffic data in the cockpit. Ground-based ADS-B infrastructure is fully operational in the United States, wherein any aircraft flying in controlled airspace must incorporate ADS-B equipment by Jan. 1, 2020.

However, with respect to unmanned aircraft, particularly smaller-scale vehicles and hobbycraft, the utility of ADS-B at altitudes under 500 feet above ground level (AGL) may be limited if dependent upon ground-based infrastructure, as the system and infrastructure were originally designed to enhance and match existing radar coverage of the National Airspace System (NAS) and ATC. In addition, ADS-B is a dual-band system in that aircraft flying above 18,000 feet mean sea level (MSL) must broadcast via ADS-B Out at 1090 MHz, while aircraft below this altitude may broadcast either at 1090 MHz or via 978 MHz Universal Access Transceiver (UAT). As a result, some aircraft equipped for air-to-air reception at one frequency may not "hear" position reports at the other frequency. To mitigate this problem, some ADS-B avionics may "listen" at both frequencies although they may transmit at 1090 MHz only. Further, ground-based stations may rebroadcast position reports between frequencies (Automatic Dependent Surveillance-Rebroadcast, or ADS-R) if aircraft operating on different frequencies are in proximity to each other, adding latency to the system.

While ADS-B may be a promising solution for safely integrating UAS into the NAS, there may be consequences not previously projected or considered. For example, a high density of UAS operating within a given airspace at low altitudes, and broadcasting position information even at reduced intervals, may result in co-channel interference sufficient to adversely impact air-to-air ADS-B performance between manned civilian aircraft.

SUMMARY

A system for intelligent non-disruptive airspace integration of unmanned aircraft systems (UAS) is disclosed. In embodiments, the system includes an onboard positioning system that determines, via satellite-based navigation or subsystems of like precision, a current position of the UAS. The system includes an altimeter aboard the UAS for determining a current altitude of the UAS. The system includes onboard data storage for storing configuration data of the UAS, such as a unique identifier, and terrain and aircraft databases with additional information about the surrounding environment and its attendant air traffic. The system includes a transceiver including one or more processors, the transceiver capable of receiving transmissions from nearby aircraft and ground-based traffic and control facilities. The transceiver decodes these inbound transmissions to identify proximate aircraft (and whether said aircraft are manned or unmanned) as well as controlled or restricted airspaces in or near the flightpath of the UAS. The transceiver continually assesses a transmission state of the UAS, which may be a default or "inert" state or, if certain conditions are met, an "alert" state. When in the "alert" state the transceiver encodes current position/altitude and identifier information into a message format which is broadcast to alert the proximate vehicles to the presence of the UAS. The transceiver employs intelligent transmission strategies to reduce spectrum congestion; when in the "alert" state the UAS will transmit at preconfigured intervals or power levels (e.g., reduced power, reduced frequency) based on air traffic or airspace control restrictions. The "alert" state continues until the conditions driving the "alert" state end, wherein the "inert" state resumes.

In embodiments, the "alert" state is declared based on the proximity of neighboring aircraft (e.g., distance and/or altitude).

In embodiments, the "alert" state is declared when the UAS exceeds a preconfigured or imposed altitude threshold.

In embodiments, the transceiver is wirelessly linked to a remote operator or pilot in command (PIC) via a control device capable of accepting command input from the PIC (e.g., via a command/control (C2) link).

In embodiments, the "alert" state is declared based on a loss of the C2 link.

In embodiments, the "inert" state is resumed based on re-establishment of the C2 link.

In embodiments, the "alert" state is manually declared by the PIC.

In embodiments, the transceiver identifies the particular frequency at which the received transmission was sent, and transmits an alert-mode response at the identified frequency.

In embodiments, the system is embodied in an attachable apparatus connectable to the UAS control system via physical data link.

In embodiments, the altimeter is a barometric altimeter or like altimeter capable of determining a pressure altitude.

In embodiments, the altimeter determines the current altitude via correlation with other like altitude sensors, e.g., a radar altimeter, the UAS control system, or the terrain database.

In embodiments, the transceiver transmits alert mode responses at a low power level under 1 watt.

In embodiments, the transceiver determines the unique identifier of the transmitting aircraft by decoding the incoming transmission and determines whether the transmitting aircraft is manned or unmanned.

In embodiments, if the aircraft is unmanned, the transceiver does not transmit alert-mode responses.

In embodiments, if the aircraft is unmanned, the transceiver transmits alert-mode responses at a particular preconfigured power level and frequency.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
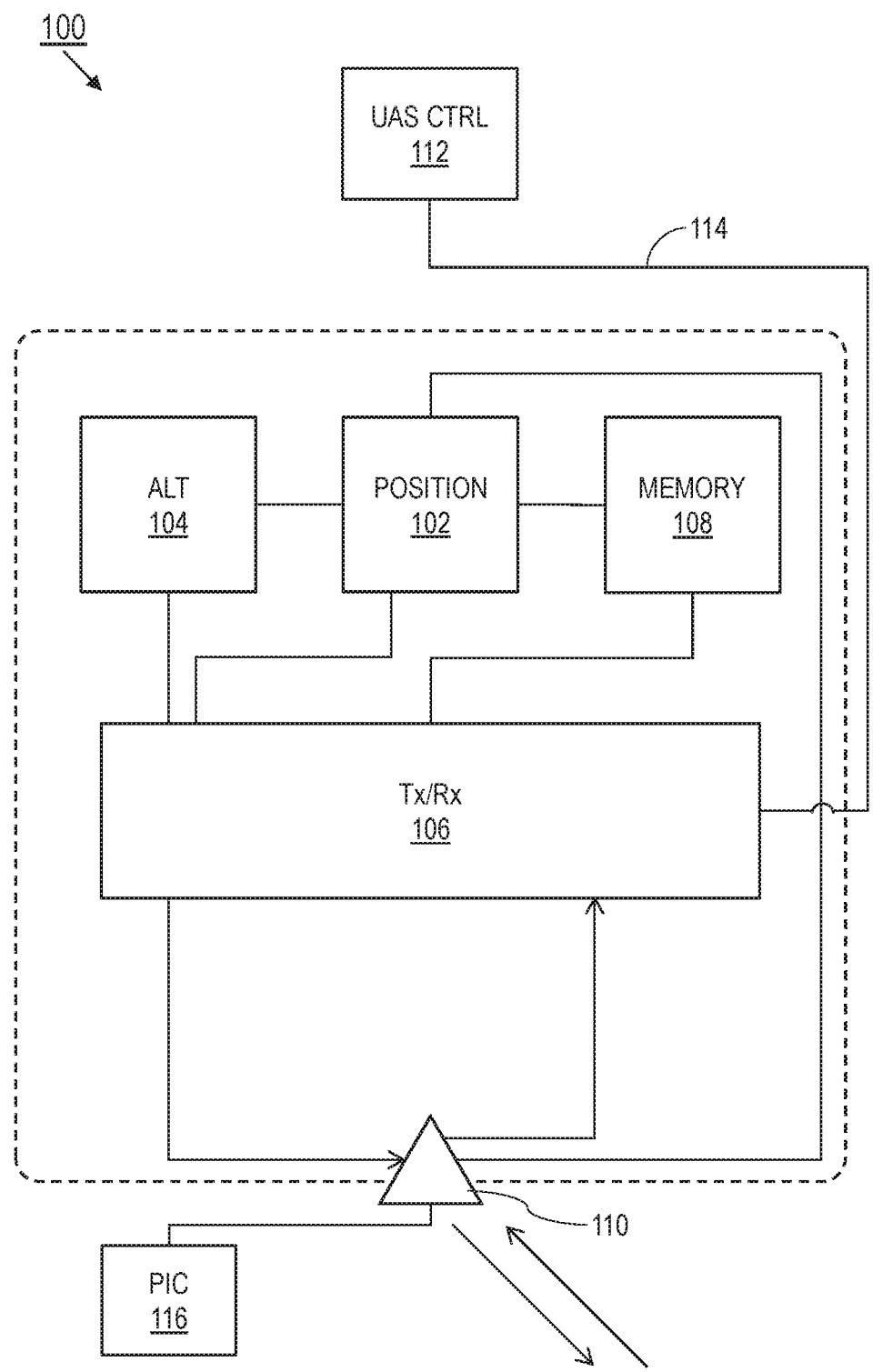
FIG. 1 is a block diagram illustrating an inert/alert system for an unmanned aircraft system (UAS), in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An intelligent, non-disruptive "inert/alert" system for airspace integration of a UAS is disclosed. Broadly, embodiments of the inventive concepts disclosed herein may mitigate spectrum congestion concerns due to the proliferation of small UAS (SUAS) equipped with ADS-B functionality within an airspace. In particular, embodiments of intelligent ADS-B systems may reduce co-channel interference by transmitting or broadcasting only when there is an imperative to do so, e.g., for safety or compliance reasons. Operating either on a standalone basis or integrated into UAS control systems, intelligent ADS-B "inert/alert" systems may reduce transmission power and range generally to reduce interference, or broadcast only when transmission is determined to be necessary. When particular conditions are met, the system shifts from a default "inert mode" into "alert mode", broadcasting regular position updates until the underlying conditions are no longer present and "inert mode" is resumed.

Referring to FIG. 1, the inert/alert system 100 may include a positioning system 102, an altimeter 104, a transceiver 106, a memory 108 or other like data storage, and antenna elements 110. The inert/alert system 100 may be incorporated into the onboard control system 112 of a SUAS or other unmanned aircraft, or embodied in a device attachable or mountable to the SUAS airframe, capable of communication with the SUAS control system via one or more physical data links 114. The inert/alert system 100 may be wirelessly linked, along with the SUAS control system 112, to a remote operator 116 (e.g., pilot-in-command (PIC)) providing command input to the SUAS control system 112, e.g., via a portable computing device or other similar controller device incorporating control processors.

The positioning system 102 may be a Global Positioning System (GPS) or other satellite-based position receiver capable of determining a current position (e.g., latitude/longitude) of the SUAS of sufficient precision for ADS-B compatibility. The positioning system 102 may continually determine the position of the SUAS, which may include logging the current position to memory (108) or updating the remote operator 116.

Similarly, the altimeter 104 may monitor (e.g., log, update) the current altitude of the SUAS. The altimeter 104 may be a barometric device, Mode-C transponder, or similar sensor capable of determining and reporting a barometric altitude. In some embodiments, the altimeter 104 may include, or may correlate a reported barometric altitude with, other onboard sensors such as a radar altimeter. Similarly, the altimeter 104 may include a processor capable of correlating the reported barometric altitude, with, e.g., Mode-C transponder transmissions received from proximate aircraft, with an autopilot system or the control system 112 of the SUAS, with terrain databases stored to memory 108 and cross-referenced with the GPS-derived position.

Under normal operational conditions, the inert/alert system 100 may remain in a default or "inert" mode. For example, while in "inert" mode, the transceiver 106 may continuously "listen to" and monitor incoming transmissions to assess the current position and altitude of the SUAS relative to proximate and neighboring aircraft. The transceiver 106 may, via the antenna elements 110, receive ADS-B and ADS-R transmissions, transponder messages (e.g., Mode A/C/S) from other aircraft, Flight Information System-Broadcast (FIS-B) and Traffic Information System-Broadcast (TIS-B) transmissions from ground control facilities. The transceiver 106 may include processors capable of decoding inbound transmissions to compare the current position of the SUAS to nearby aircraft and assess, on a continuous or interval basis, whether any condition exists providing for a declaration of "alert mode". Similarly, the transceiver 106 may determine, based on the current position and altitude sensed by the positioning system 102 and altimeter 104, additional attributes of the SUAS (e.g., if preconfigured to do so by the remote operator 116). For example, the transceiver 106 may calculate or log a current airspeed or rate of climb/descent.

Figure 2A:
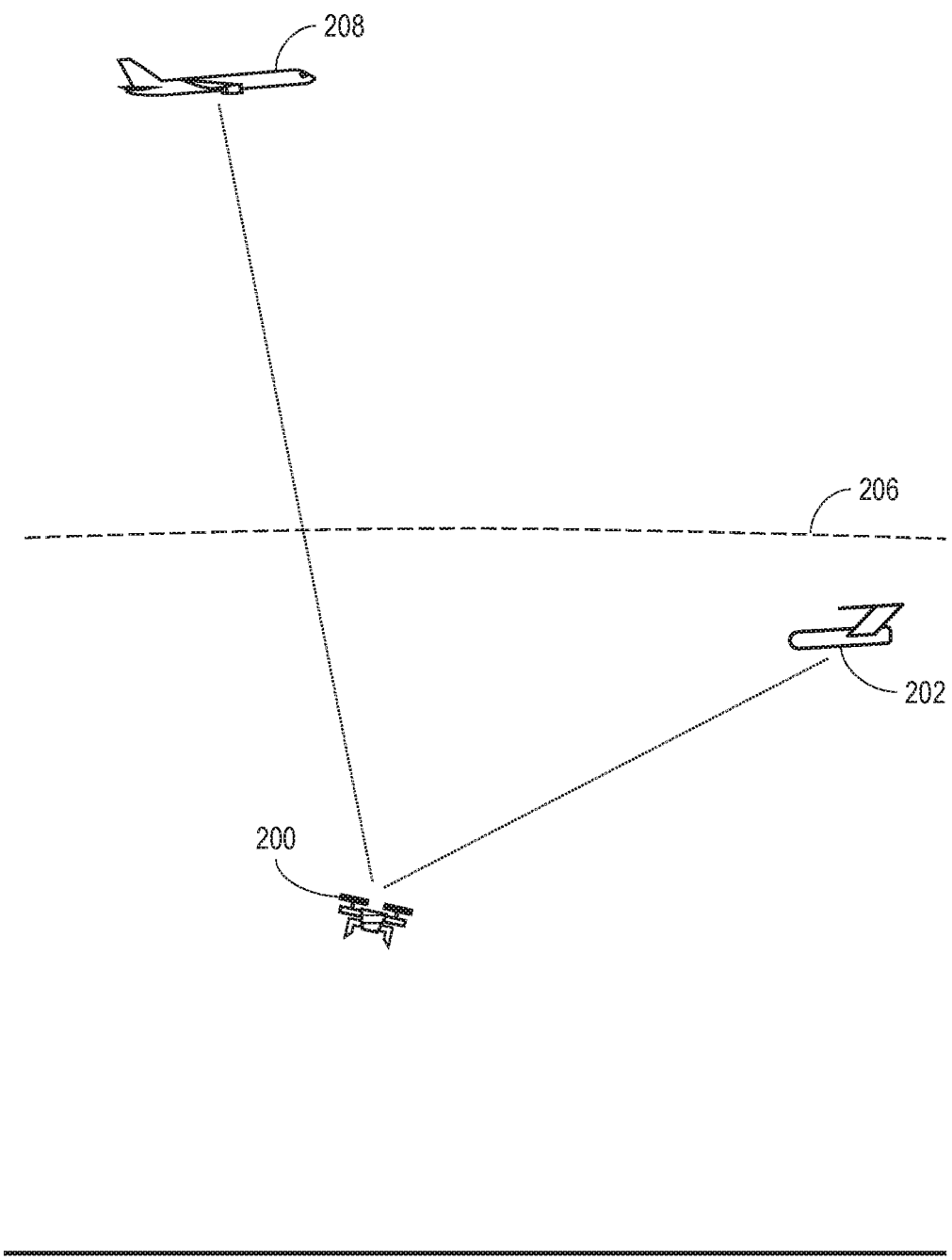
FIGS. 2A and 2B are diagrammatic illustrations of operations of the inert/alert system of FIG. 1 in accordance with example embodiments of this disclosure.
Figure 2B:
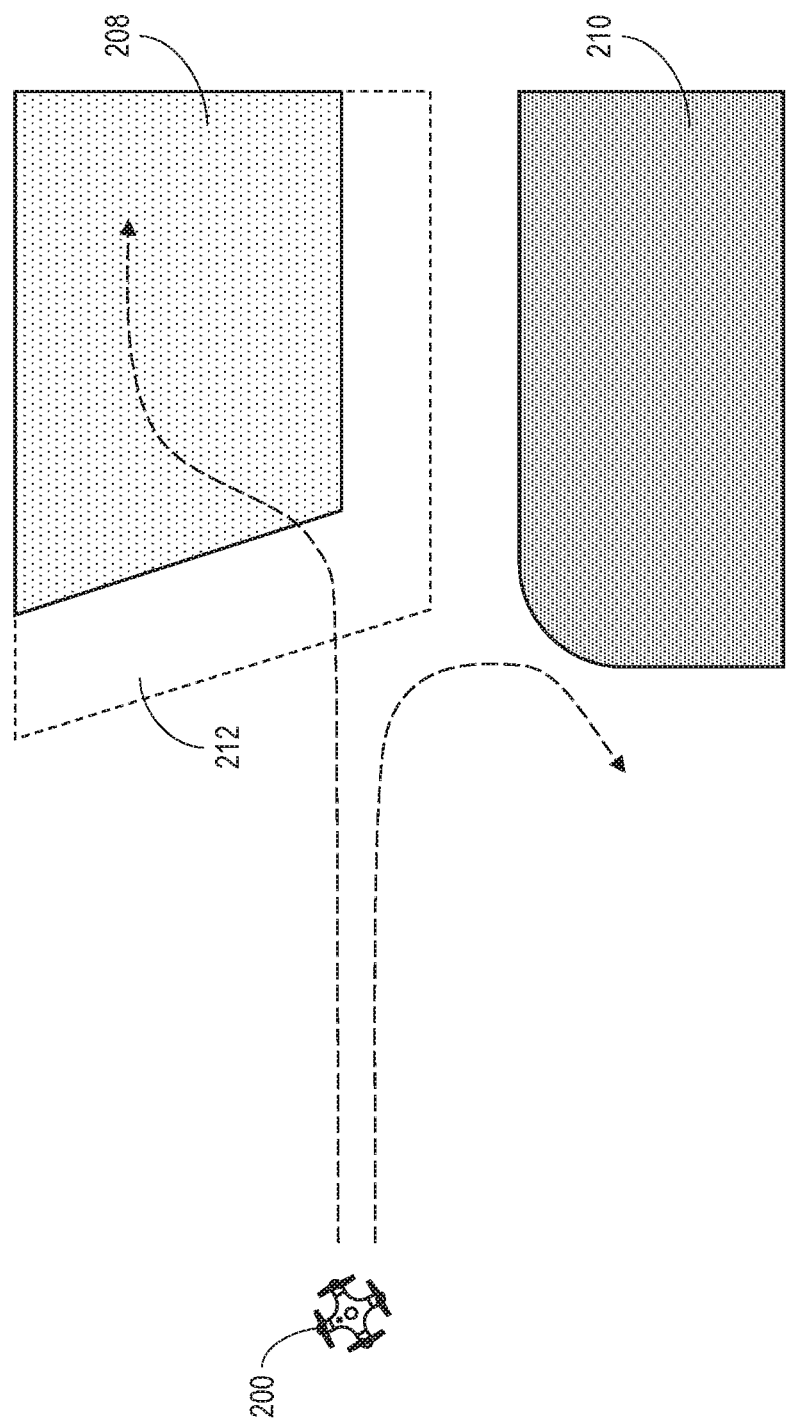

Referring also to FIGS. 2A and 2B, a small unmanned aircraft system 200 (SUAS) incorporating the inert/alert system 100 of FIG. 1 is shown. Based on position assessments by the transceiver 106, the inert/alert system 100 may continually reaffirm the default "inert" mode or declare that the SUAS is in an "alert" mode if any of a variety of predetermined conditions, or some predetermined combination of conditions, are present. For example, any of the following conditions may trigger the declaration of "alert" mode:

The inert/alert system 100 detects nearby traffic (e.g., an unmanned aircraft 202 or manned commercial aircraft 204) within a predetermined positional or altitude range, e.g., with 7 nautical miles (NM) or 2,000 ft of altitude. For example, if the manned commercial aircraft 204 is traveling at 150 NM on a direct collision course with the SUAS 200 (itself traveling at its Part 107 (14 CFR § 107) maximum allowed airspeed of 87 NM), the manned aircraft would be left with 1.77 minutes (~1 min 46 sec) to execute evasive or avoidance maneuvers.

The inert/alert system 100 determines that the SUAS 200 has exceeded a preconfigured altitude ceiling 206, e.g., exceeding 400 ft above ground level (AGL), the altitude ceiling imposed by the United States Federal Aviation Administration (FAA).

The inert/alert system 100 determines that the SUAS 200 is approaching, or has breached, a controlled airspace 208, or that the SUAS 200 is approaching, or has breached, a Temporary Flight Restriction 210 (TFR) or otherwise geofenced/prohibited airspace.

The inert/alert system 100 determines that the link to the remote operator 116 is lost (e.g., a command/control (C2) link), or that positive control by the remote operator/PIC is otherwise compromised.

In addition, the remote operator 116 may manually declare an "alert" mode.

In some embodiments, the declaration of an "alert" mode by the inert/alert system 100 may direct the transceiver 106 to encode the current position and altitude (and, e.g., other pertinent information, such as airspeed) along with an identification code (e.g., tail number, ICAO identifier) uniquely identifying the SUAS. The encoded information may be transmitted by the transceiver 106 (e.g., in ADS-B or any similarly appropriate commonly recognizable or decodable message format) at preconfigured intervals while the alert conditions remain present (or until the inert/alert system 100 declares an "inert" mode).

In some embodiments, while broadcasting to proximate aircraft (e.g., unmanned aircraft 202 or manned commercial aircraft 204) that the SUAS 200 is nearby (and possibly that, based on its airspeed and/or heading, a collision may be imminent), the inert/alert system 100 may take additional measures to guard against spectrum congestion or co-channel interference. For example, the inert/alert system 100 may transmit at lower power settings or at less frequent intervals than the standard ADS-B Out interval of one second, e.g., transmitting at 1 W power at 10-second intervals. Lower-power transmissions, e.g., 0.5 W or even as low as 0.01 W, may be employed by the transceiver 106 to minimize impact on spectral capacity in situations where the limited range of such transmissions presents no risk to the safety of the SUAS 200 or to proximate air traffic.

In some embodiments, the declaration of "alert" mode by the inert/alert system 100 is combined with selective deployment of transmissions to prevent spectrum congestion. For example, by decoding an incoming ADS-B message from a proximate manned aircraft 204, the transceiver 106 may confirm that the message was transmitted at 1090 MHz and transmit an alert-mode response (e.g., the current position and identifier of the SUAS 200) at the same frequency to alleviate the need for a corresponding ADS-R transmission (e.g., if the alert-mode responses were transmitted at 978 MHz) and the attendant system latency.

Similarly, the proximate aircraft (e.g., the unmanned aircraft 202) may present a Mode-C/Mode-S transponder transmission source that does not correlate with any ADS-B transmission source identified by the inert/alert system 100. If the transponder-indicated altitude is within the proximate envelope of the SUAS 200 (e.g., within 2,000 feet), the inert/alert system 100 may declare an "alert" mode and begin transmitting the current position and identifier, e.g., via ADS-B. While the unmanned aircraft 202 may not be ADS-B enabled, its remote operator may be equipped with a portable communications device having ADS-B In capacity and would thereby be able to "see" the SUAS 200. The inert/alert system 100 may further integrate with noncooperative radar aboard the SUAS 200, e.g., for transmission when in the vicinity of a noncooperative target.

In some embodiments, the inert/alert system 100 may monitor TFRs 210 or controlled airspaces 208 via preflight configuration, e.g., loading into memory 108 any known TFRs and/or controlled airspace boundaries and restrictions prior to takeoff. Similarly, the inert/alert system 100 may monitor any additional TFRs 210 or corresponding information by decoding received FIS-B messages via the transceiver 106. While flying through the controlled airspace 208, if an "alert" mode is declared the inert/alert system 100 may transmit the current position and unique identifier in compliance with any known restrictions imposed by the controlled airspace (e.g., power level, frequency, interval).

In some embodiments, the inert/alert system 100 may incorporate geospatial buffering (212) in order that alert-mode response transmissions are compliant with controlled-airspace restrictions prior to actual entry into the controlled airspace 206.

In some embodiments, referring in particular to FIG. 2A, the inert/alert system 100 may, when in "alert" mode, selectively transmit alert-mode responses based on other information derived from transmissions received and decoded by the transceiver 106 (FIG. 1). For example, the ADS-B message format includes a field "emitter category" which defines a type of aircraft (e.g., the transmission source). The inert/alert system 100 may reduce spectrum congestion by transmitting alert-mode responses based on the proximity of the manned aircraft 204 to the SUAS 200, but not transmitting alert-mode responses if only the unmanned aircraft 202 is determined to be sufficiently proximate to the SUAS (e.g., assuming additional or other means and technologies available for mutual remote identification of the SUAS 200 and the unmanned aircraft 202). In some embodiments, the inert/alert system 100 may leverage emitter category information under high-density conditions such that, for example, the proximity of the unmanned aircraft 202 to the SUAS 200 may trigger alert-mode transmissions between the SUAS and the unmanned aircraft but not induce a chain reaction with other unmanned aircraft not within the proximity envelope of the SUAS 200.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for intelligent non-disruptive airspace integration of unmanned aircraft systems (UAS), comprising:
   a positioning system situated aboard a UAS and configured to determine a current position of the UAS;
   at least one altimeter situated aboard the UAS and configured to determine a current altitude of the UAS;
   a memory situated aboard the UAS and configured to store configuration data associated with the UAS, the configuration data including at least a unique identifier corresponding to the UAS;
   and
   at least one transceiver coupled to the positioning system and the altimeter, the transceiver including at least one processor and configured to:
      receive one or more transmissions from at least one of a first aircraft and a ground-based traffic control facility;
      identify an alert state associated with at least one of:
         a) a proximate position of the first aircraft; and
         b) a current position associated with at least one of a controlled airspace and a restricted airspace;
      continually determine a transmission state of the UAS, the transmission state corresponding to one of a default state or the alert state,
      and
      while the transmission state corresponds to the alert state, transmitting at least the current position and the unique identifier at one or more of a response frequency, a response power level, and a predetermined interval.

2. The system of claim 1, wherein the default state is associated with non-transmission of the current position and the unique identifier.

3. The system of claim 1, wherein the alert state is associated with the proximate position of the first aircraft within a predetermined range of one or more of the current altitude and the current position.

4. The system of claim 1, wherein the alert state is associated with the current altitude exceeding an altitude threshold.

5. The system of claim 1, wherein the transceiver is wirelessly coupled to an operator remotely located from the UAS via a wireless link to a control device configured to accept command input from the operator.

6. The system of claim 5, wherein the alert state is associated with a loss of the wireless link.

7. The system of claim 6, wherein the default state is determined based on a subsequent reestablishment of the wireless link.

8. The system of claim 5, wherein the alert state is manually determined by the operator via the control device.

9. The system of claim 1, wherein the transceiver is configured to:
   identify a transmitted frequency associated with the received transmissions;
   and
   the predetermined frequency corresponds to the transmitted frequency.

10. The system of claim 1, wherein the system is embedded in an apparatus removably attachable to an airframe of the UAS and couplable thereto by at least one data link.

11. The system of claim 1, wherein the altimeter includes a barometric altimeter.

12. The system of claim 1, wherein the altimeter is configured to determine the current altitude by correlating a sensed first altitude with a second altitude associated with at least one of a radar altimeter, a control system of the UAS, and a terrain database stored to the memory.

13. The system of claim 1, wherein the response power level is not more than one watt.

14. The system of claim 1, wherein the unique identifier is a first unique identifier and the transceiver is configured to:

identify, by decoding the received transmissions, a second unique identifier of the first aircraft;
   and
   determine, based on the second unique identifier, whether the first aircraft is a manned aircraft or an unmanned aircraft.

15. The system of claim 14, wherein:
   when the first aircraft is an unmanned aircraft, the transceiver is configured to not transmit the current position and the first unique identifier.

16. The system of claim 14, wherein the response power level is a first response power level and the response interval is a first response interval:
   when the first aircraft is an unmanned aircraft, the transceiver is configured to transmit the current position and the first unique identifier according to at least one of a second response power level and a second response interval.

* * * * *